(12) United States Patent
Henrion et al.

(10) Patent No.: US 11,242,136 B2
(45) Date of Patent: Feb. 8, 2022

(54) METHOD OF MOVING AN AIRCRAFT UNDERCARRIAGE BETWEEN A DEPLOYED POSITION AND A RETRACTED POSITION

(71) Applicant: SAFRAN LANDING SYSTEMS, Velizy Villacoublay (FR)

(72) Inventors: Philippe Henrion, Velizy Villacoublay (FR); Sébastien Dubois, Velizy Villacoublay (FR); Bertrand Euzet, Velizy Villacoublay (FR); Marc Quenerch'Du, Velizy Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 385 days.

(21) Appl. No.: 16/214,964

(22) Filed: Dec. 10, 2018

(65) Prior Publication Data
US 2019/0176972 A1    Jun. 13, 2019

(30) Foreign Application Priority Data

Dec. 11, 2017    (FR) ...................... 1761956

(51) Int. Cl.
*B64C 25/24*       (2006.01)
*B64C 25/34*       (2006.01)
(Continued)

(52) U.S. Cl.
CPC .............. *B64C 25/24* (2013.01); *B64C 25/14* (2013.01); *B64C 25/20* (2013.01); *B64C 25/26* (2013.01); *B64C 25/34* (2013.01)

(58) Field of Classification Search
CPC ......... B64C 25/14; B64C 25/18; B64C 25/20; B64C 25/24; B64C 25/26
See application file for complete search history.

(56) References Cited

U.S. PATENT DOCUMENTS

| 2,385,063 | A | * | 9/1945 | Dreifke | B64C 25/26 244/102 R |
| 3,198,461 | A | * | 8/1965 | Beach | B64C 25/20 244/102 R |

(Continued)

FOREIGN PATENT DOCUMENTS

| EP | 0 026 689 A2 | 4/1981 |
| FR | 2 928 623 A1 | 9/2009 |

(Continued)

OTHER PUBLICATIONS

Preliminary French Search Report for 1761956 dated May 30, 2018.

*Primary Examiner* — Philip J Bonzell
*Assistant Examiner* — Tye William Abell
(74) *Attorney, Agent, or Firm* — Sughrue Mion, PLLC

(57) ABSTRACT

The invention provides a method of moving an aircraft undercarriage comprising a leg (1) that is movable between a deployed position and a retracted position in which the leg is held stationary by means of a strut (2) held in an aligned position by a stabilizer member (4), the method including using a drive actuator (10) for raising the undercarriage from the deployed position to the retracted position. According to the invention, the actuator is coupled firstly to the leg and secondly to the stabilizer member in such a manner that on being activated the actuator begins by causing the stabilizer member to unlock and then moves the undercarriage leg towards the retracted position.

4 Claims, 4 Drawing Sheets

(51) Int. Cl.
 *B64C 25/20* (2006.01)
 *B64C 25/26* (2006.01)
 *B64C 25/14* (2006.01)

(56) References Cited

U.S. PATENT DOCUMENTS

| | | | | | |
|---|---|---|---|---|---|
| 4,355,773 | A | * | 10/1982 | Masclet | B64C 25/14 244/102 R |
| 5,022,609 | A | * | 6/1991 | Cranston | B64C 25/12 244/102 R |
| 2011/0163202 | A1 | * | 7/2011 | Martinez | B64C 25/26 244/102 SL |
| 2012/0080559 | A1 | * | 4/2012 | Keller | B64C 25/20 244/102 A |

FOREIGN PATENT DOCUMENTS

| | | |
|---|---|---|
| FR | 2 946 319 A1 | 12/2010 |
| GB | 2501906 A | 11/2013 |

* cited by examiner

METHOD OF MOVING AN AIRCRAFT UNDERCARRIAGE BETWEEN A DEPLOYED POSITION AND A RETRACTED POSITION

The invention relates to an aircraft undercarriage that is movable between a deployed position and a retracted position.

BACKGROUND OF THE INVENTION

Aircraft undercarriages are known that are movably mounted on an aircraft to move between a retracted position and a deployed position. In general, each undercarriage is associated both with a drive actuator for moving the undercarriage from one of the positions to the other, and also with an unlocking actuator for unlocking a stabilizer member that holds the rods of a strut in an aligned position.

Nevertheless, it is possible to use only one actuator to perform both functions. By way of example, proposals are made in document FR 2 946 319 to use a drive actuator of rotary electromechanical type coupled to one of the arms of the member for stabilizing the strut in the aligned position, in order both to drive the undercarriage, and also to unlock the stabilizer member. That actuator is secured to the structure of the aircraft, and thus requires the structure to be designed to receive such an actuator.

OBJECT OF THE INVENTION

The invention seeks to propose a method of moving an aircraft undercarriage between a deployed position and a retracted position, while making the undercarriage simpler to install on the structure of the aircraft.

SUMMARY OF THE INVENTION

In order to achieve this object, there is provided a method of moving an aircraft undercarriage comprising a leg that is movable between a deployed position and a retracted position in which the leg is held stationary by means of a strut held in an aligned position, the method including using a drive actuator for raising the undercarriage from the deployed position to the retracted position. According to the invention, the actuator is coupled firstly to the leg and secondly to the stabilizer member in such a manner that activating the actuator begins by causing the stabilizer member to unlock and then moves the undercarriage leg towards the retracted position.

The method of the invention makes it possible to use a single actuator in order to unlock the stabilizer member and in order to raise the undercarriage, this actuator being directly coupled between two elements of the undercarriage so that there is no need to provide any attachment of the actuator to the structure of the aircraft. A fraction of the forces due to the actuator is transmitted to the structure of the aircraft solely via the hinge axes between the undercarriage and the structure of the aircraft.

PRESENTATION OF THE FIGURES

The invention can be better understood in the light of the following description of a particular implementation of the invention, given with reference to the figures of the accompanying drawings, in which.

DETAILED DESCRIPTION OF A PARTICULAR IMPLEMENTATION OF THE INVENTION

Figure 1:
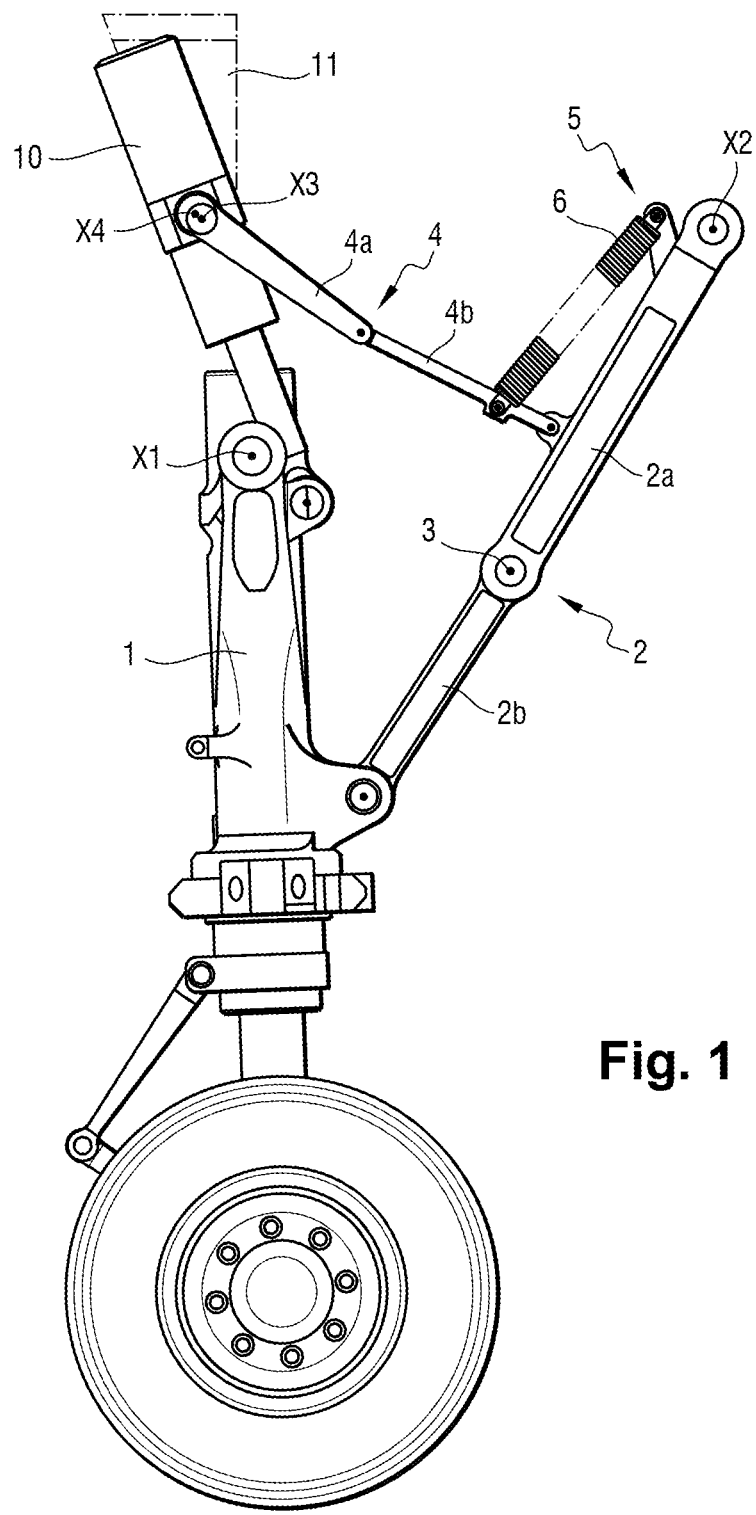
FIG. 1 is a side view of an undercarriage applying the provisions of the invention, and shown in this figure in the deployed position.
Figure 4:
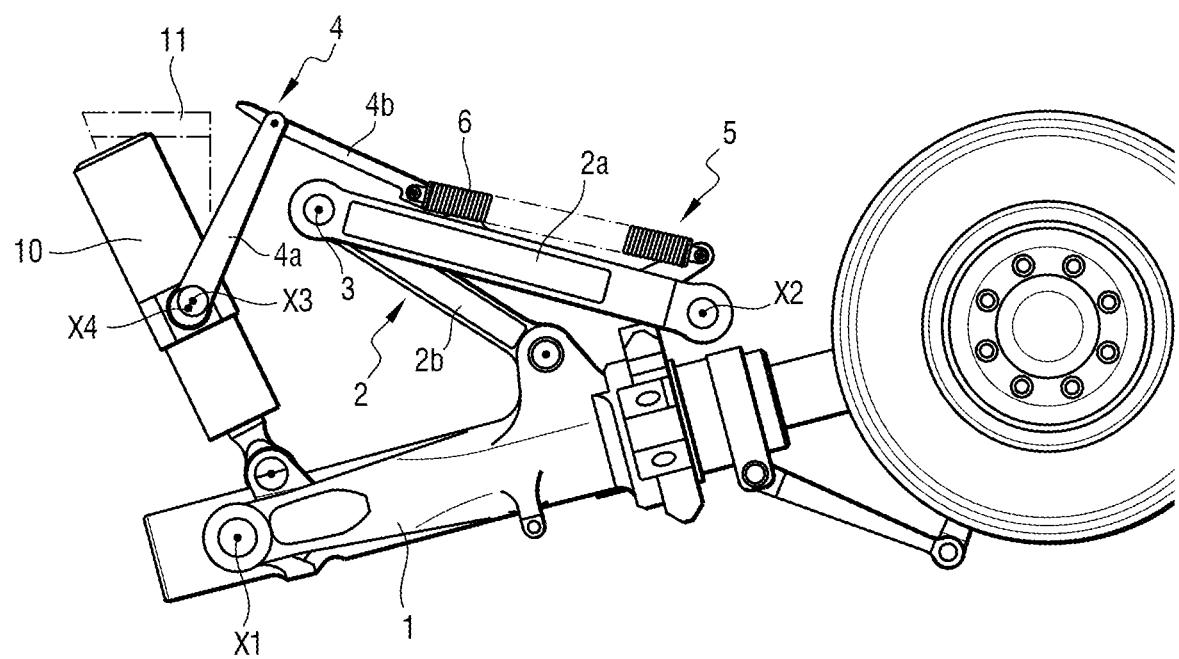
FIG. 4 is a view analogous to FIG. 1, showing the undercarriage at the end of being raised, in the retracted position.

With reference initially to FIG. 1, the undercarriage comprises in conventional manner a leg 1 hinged to the structure of an aircraft about a hinge axis X1 (seen end-on) in order to be movable between a deployed position as shown into which the undercarriage is taken prior to landing, and a retracted position, which is the position of the undercarriage in flight, and as shown in FIG. 4.

A foldable strut 2 is hinged firstly to the leg 1 and secondly to the structure of the aircraft. The foldable strut 2 comprises two rods 2a, 2b that are hinged together at a toggle knee 3. The rod 2a is also hinged to the aircraft about a hinge axis X2, while the rod 2b is hinged to the leg 1. The foldable strut 2 is stabilized in a substantially aligned position by means of a stabilizer member 4 comprising two links 4a, 4b, that are also hinged to each other. The link 4a is hinged to the aircraft about an axis X3, and the link 4b is hinged to the strut 2. The links 4a and 4b are held in a substantially aligned position by a locking member 5 having return springs 6 urging the links 4a and 4b towards the locking position as shown and as defined by abutments between the links. When stabilized in this way, the foldable strut 2 opposes any pivoting of the leg 4 about its hinge axis X1, such that the deployed position is a stable position. As is well known, the rods 2a, 2b and the links 4a, 4b are designed so that in order to reach the locked position shown in FIG. 1, the toggle knees between the rod and between the links go a little beyond a position in which the rods and the links are geometrically in alignment.

Figure 3:
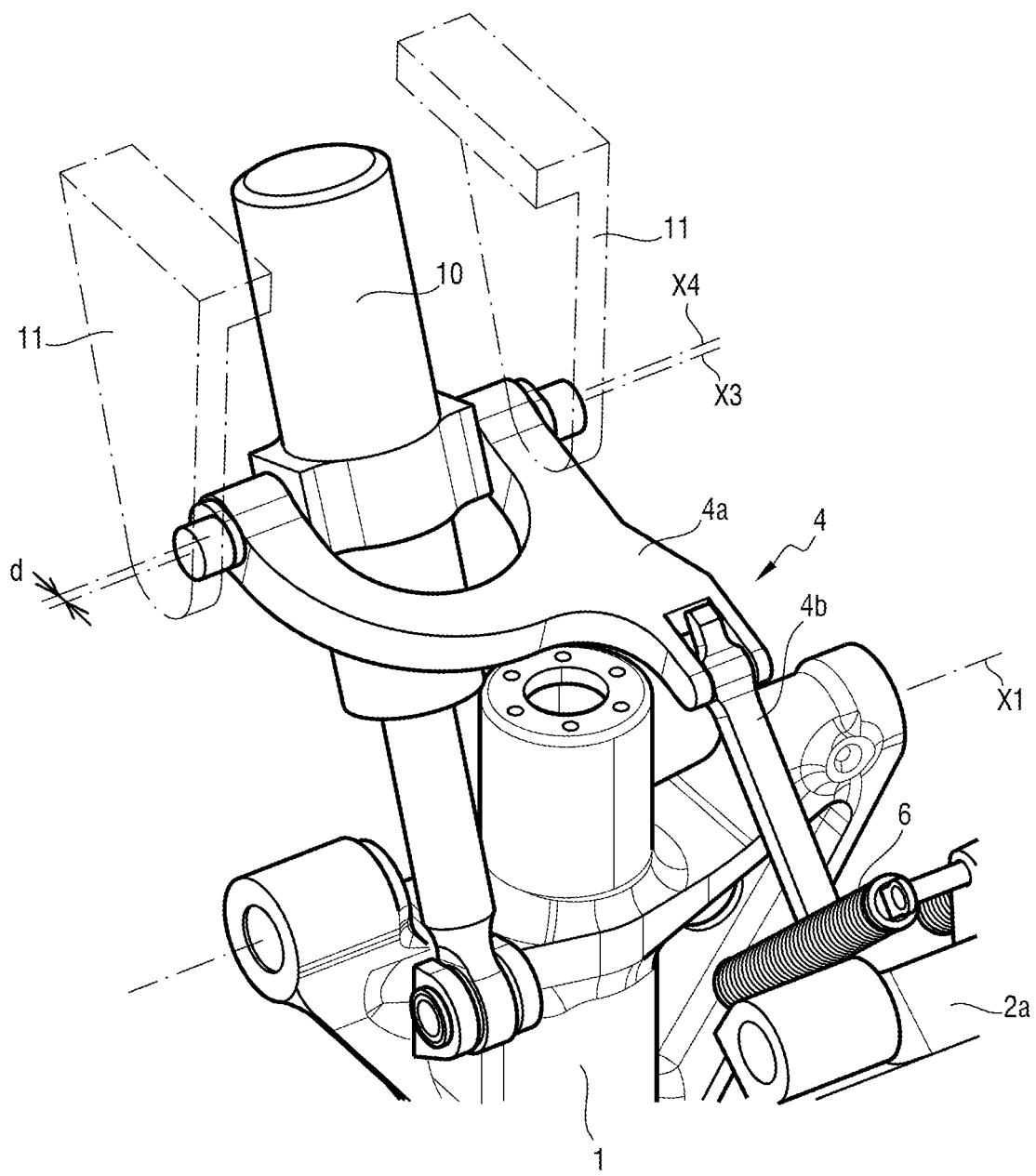
FIG. 3 is a perspective view of the undercarriage in the position of FIG. 2.

According to the invention, a drive actuator, specifically a linear actuator 10, e.g. a hydraulic actuator or an electromechanical actuator, is arranged so as to be coupled firstly to the link 4a of the stabilizer member 4 (the link that is hinged in this example to the structure of the aircraft) about a hinge axis X4, and secondly to the leg 1 of the undercarriage. As can be seen more particularly in FIG. 3, in this example the link 4a is terminated by a fork, and the actuator 10 extends between the arms of the fork so as to be pivotally mounted by stub axles to the arms of the link 4a about the axis X4 parallel to the axis X3, but offset therefrom by an offset d. FIG. 3 shows two supports 11 that come down from the ceiling of the wheel well for receiving the undercarriage in the retracted position, and that serve to hinge the link 4a to the structure of the aircraft about the axis X3. The actuator 10 is not hinged to the support, but is indeed hinged to the link 4a. In this example, the link 4b extends substantially in the plane of symmetry of the undercarriage, while the link 4a is offset, thus enabling the raising actuator 10 to pass beside the cylinder of the leg box and be coupled to the leg 1 in the proximity of one of its hinge pivots to the structure of the aircraft.

Figure 2:
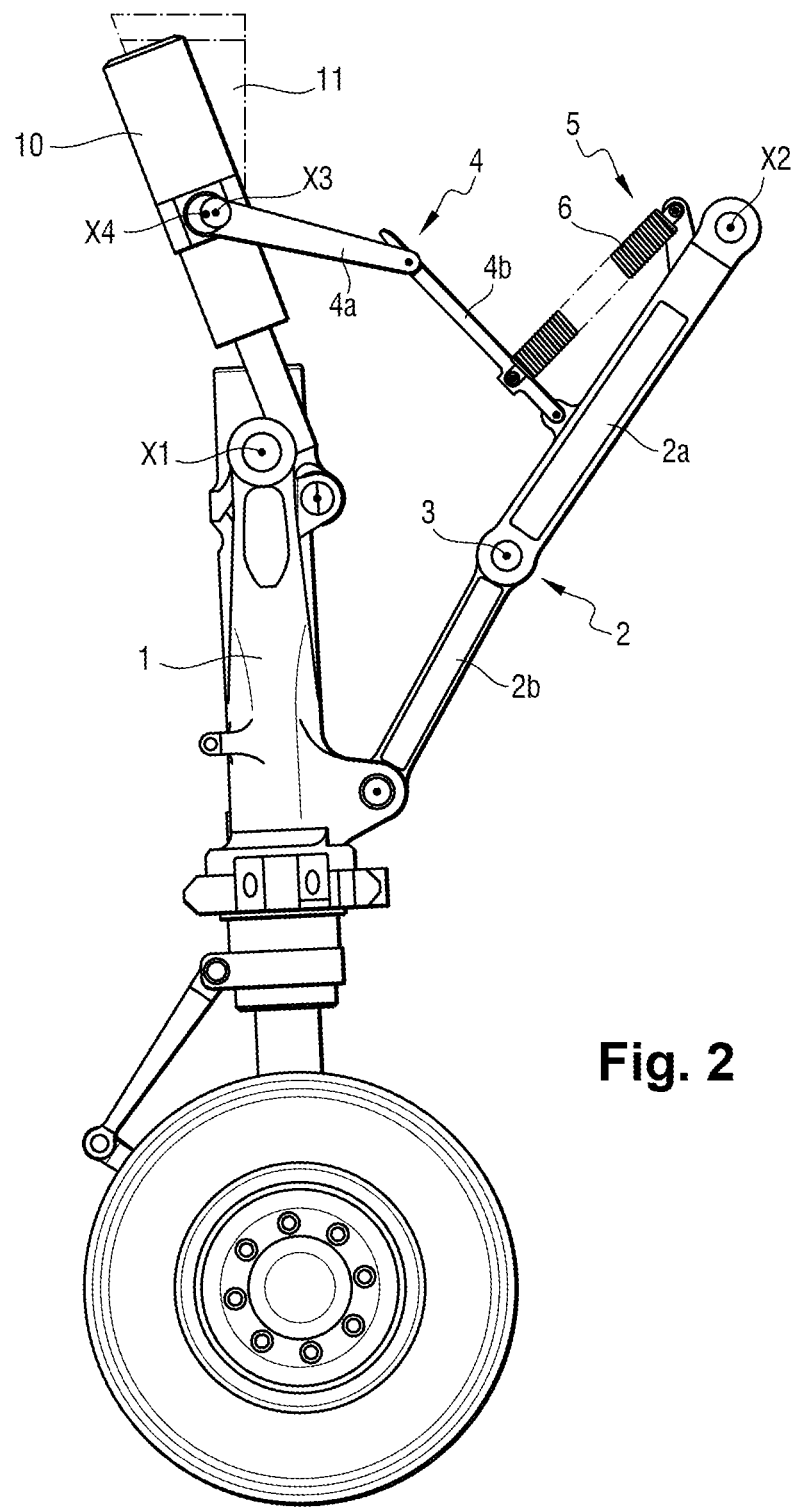
FIG. 2 is a view analogous to FIG. 1, showing the undercarriage in an unlocked position at the beginning of the raising stage.

The operation of the assembly is explained below with reference to FIGS. 1 to 4. Starting from the deployed position shown in FIG. 1, the drive actuator 10 is operated (to retract in this example) so as to exert a force on the link 4a, thereby having the effect of causing it to pivot about its hinge axis X3, as shown in FIGS. 2 and 3, thereby breaking the alignment between the links 4a and 4b against the action of the return springs 6 of the locking member 5. This pivoting movement of the link 4a is made possible by the offset between the hinge axes X3 and X4, giving rise to a small lever arm that is sufficient to enable the force from the drive actuator 10 to overcome the force from the return springs 6.

Since the link 4b is coupled to the strut 2, the alignment between the rods 2a and 2b is also broken. The undercarriage is thus unlocked and can be pivoted about its hinge axis X1 under the continued action of the drive actuator 10 until it reaches the retracted position shown in FIG. 4, in which the undercarriage may for example be held by means of a locking hook mounted on the structure of the aircraft so as to act, when the undercarriage reaches its retracted position, in order to catch a roller that is secured to the leg of the undercarriage. Thus, a single actuator can be used to unlock the stabilizer member, thereby taking the strut out of alignment, and from there moving the leg.

In order to move in the opposite direction from the retracted position to the deployed position, it suffices to release the undercarriage and allow it to drop under the effect of gravity and of aerodynamic forces, the actuator, where appropriate, possibly being used to slow down the movement on reaching the deployed position in order to avoid any damaging shock.

The distance between the two hinge axes of the actuator is not always sufficient to be compatible with the total length of a linear actuator, which is determined essentially by the working stroke of the actuator. Using a drive actuator 10 that is pivoted by means of two stub axles extending from the flanks of the body of the actuator, as shown herein, enables this type of actuator to be made compatible with the working stroke needed for moving the undercarriage. In FIG. 3, it can clearly be seen that a good half of the body of the actuator 10 projects beyond the stub axles defining the hinge axis X4 between the actuator and the link 4a.

The invention is not limited to the above description, but on the contrary covers any variant coming within the ambit defined by the claims.

In particular, although in the example shown one of the links of the stabilizer member is hinged to the structure of the aircraft, this is not necessary in the ambit of the invention, and, by way of example, the link could be hinged to the leg of the undercarriage. All that matters is that the relative movement between the link of the stabilizer member to which the actuator is coupled and the other portion of the undercarriage to which the actuator is also coupled is continuous, without any reversal, and can in a single movement serve firstly to break the alignment of the stabilizer member and then to raise the leg of the undercarriage. Likewise, the hinge axes of all of the elements of the undercarriage are not necessarily parallel with one another. Also, the drive actuator used could equally well be of the rotary type.

The invention claimed is:

1. A method of moving an aircraft undercarriage,
the aircraft undercarriage comprising a leg (1) that is movable between a retracted positon and a deployed position in which the leg is held stationary by means of a strut (2) held in an aligned position by a stabilizer member (4) comprising two links (4a, 4b), one of which is hinged to the structure of the aircraft, the method including using a single drive actuator (10) for raising the undercarriage from the deployed position to the retracted position,
wherein the single drive actuator is only coupled to the leg and to the stabilizer member,
the method comprising:
on being activated the single drive actuator begins by causing the stabilizer member to unlock and then moves the undercarriage leg to the fully retracted position.

2. The method according to claim 1,
wherein the two links (4a, 4b) are urged into the aligned position by a return member (5), one of the links being hinged to the structure of the aircraft about a hinge axis (X3), and
wherein the drive actuator (10) is a linear actuator hinged to the link about a hinge axis (X4) parallel to the hinge axis (X3) of the link to the structure of the aircraft, but offset therefrom.

3. The method according to claim 2,
wherein the link (4a) hinged to the structure of the aircraft is terminated by a fork having two arms between which the drive actuator (10) extends in order to be hinged to the arms of the fork.

4. The method according to claim 3,
wherein the drive actuator (10) is hinged to the arms of the fork by means of stub axles.

* * * * *